(12) United States Patent
Fan

(10) Patent No.: US 8,282,060 B2
(45) Date of Patent: Oct. 9, 2012

(54) AUXILIARY FASTENING APPARATUS

(76) Inventor: Eagle Fan, Hsinchu (TW)

( * ) Notice: Subject to any disclaimer, the term of this patent is extended or adjusted under 35 U.S.C. 154(b) by 285 days.

(21) Appl. No.: 12/831,433

(22) Filed: Jul. 7, 2010

(65) Prior Publication Data

US 2011/0290970 A1    Dec. 1, 2011

(30) Foreign Application Priority Data

May 31, 2010    (TW) .............................. 99210313 U

(51) Int. Cl.
*E04G 3/00*    (2006.01)

(52) U.S. Cl. .................. 248/291.1; 248/121; 248/284.1; 248/917; 361/679.21

(58) Field of Classification Search ............... 248/284.1, 248/292.12–292.14, 917–923, 121, 291.1; 361/679.07, 679.21, 679.22, 679.41, 679.44, 361/679.2

See application file for complete search history.

(56) References Cited

U.S. PATENT DOCUMENTS

| | | | |
|---|---|---|---|
| 5,436,792 A * | 7/1995 | Leman et al. ............ | 361/679.44 |
| 5,923,528 A * | 7/1999 | Lee .......................... | 361/679.07 |
| 6,510,049 B2 * | 1/2003 | Rosen ........................... | 248/919 |
| 6,639,788 B1 * | 10/2003 | Liao et al. ................ | 248/292.14 |
| 7,492,579 B2 * | 2/2009 | Homer et al. ............ | 361/679.41 |
| 7,542,052 B2 * | 6/2009 | Solomon et al. .............. | 345/659 |
| 7,593,218 B2 * | 9/2009 | Hwang et al. ............ | 361/679.21 |
| 7,798,457 B2 * | 9/2010 | Chih et al. ............... | 248/292.14 |

* cited by examiner

*Primary Examiner* — Tan Le
(74) *Attorney, Agent, or Firm* — Rabin & Berdo, P.C.

(57) ABSTRACT

An auxiliary fastening apparatus for engaging with tablet electronic device is provided, including a receiving unit, an angle adjustment mechanism and a support unit. The apparatus may further include an auxiliary belt. The receiving unit is for placing the tablet PC on, and the angle adjustment mechanism and the support unit are to enable the receiving unit to stand in either portrait or landscape mode. The auxiliary belt can be wrapped around the wrist to prevent the handheld tablet PC from slipping and falling to the ground. The unique structure of the support unit allows the tablet PC to tilt a small angle when placed on a desk top for convenient use. The auxiliary fastening apparatus of the present invention provides convenient use of the tablet PC in various occasions.

10 Claims, 8 Drawing Sheets

AUXILIARY FASTENING APPARATUS

FIELD OF THE INVENTION

The present invention generally relates to an auxiliary fastening apparatus, applicable to tablet-shaped electronic devices, such as, tablet PC and electronic books, for convenient operations of the electronic devices for reading or viewing.

BACKGROUND OF THE INVENTION

Tablet PCs has been marketed for many years. With the progress of touch panel technology and application developments in recent years, tablet PC is easier to operate than before. The large-sized display and suitable weight also accelerate the acceptance of the tablet PC in the portable device markets. In addition, the flexible orientation of the display screen, switching between portrait mode or landscape mode, allows the tablet users more convenience and fun in using the tablet PC.

However, when using a tablet PC, most people tend to hold the tablet in one hand and using the other hand to operate the touch panel. The holding on the tablet PC must be firm and sturdy, otherwise, a slip may cause the tablet PC to fall and render damaged and useless. On the other hand, when placed on desk, the tablet PC tends to lie flat on the desk like a book, which is different from the conventional way of viewing a PC display. Additional problems, such as, light reflection, awkward input position, also increases the inconvenience of use. The inconvenience issue is even more prominent when viewing the video on a tablet PC. The long time holding on the tablet PC in one hand is tiring to the viewer, so that most users may let the table PC lean against another object so that the tablet PC and stand in a tilted angle for bettering viewing. However, the slip of the tablet PC is a potential danger at a leaning angle. Therefore, it is imperative to devise an apparatus to be used with tablet PC to improve the convenience of use.

SUMMARY OF THE INVENTION

The primary object of the present invention is to provide an auxiliary fastening apparatus for using tablet PC. With the auxiliary fastening apparatus of the present invention, the user can hold the tablet PC in a safer and more stable way as well as improve the convenience of using the tablet PC. The tablet PC can also be placed standing up on a flat surface, or hanging on a wall for convenient viewing of the video.

Another object of the present invention is to provide a small-sized portable auxiliary fastening apparatus for using the tablet PC. With only a small increase of the thickness to the tablet PC, the user can operate the tablet PC more easily.

To achieve the above objects, the present invention provides an auxiliary fastening apparatus, including a receiving unit, an angle adjustment mechanism, and a support unit. The receiving unit has a large-area disk, with a plurality of protruding clappers on the disk circumference. The rear surface of the disk is the back of the receiving unit, forming the angle adjustment mechanism. The support unit is coupled to the angle adjustment mechanism. The angle adjustment mechanism allows the support unit to adjust angle at the back of the receiving unit, and the support unit can form an angle with the back of the receiving unit after flipped up.

In addition, the auxiliary fastening apparatus further includes an auxiliary belt. The auxiliary belt is connected to either the receiving unit or the angle adjustment mechanism to provide the user for wrapping around the wrist to prevent the tablet PC from slipping from the holding hand. Alternatively, the auxiliary belt can be used to hang the tablet PC on a wall for viewing video.

Furthermore, the support unit can include a support element, a connection element and a buckle element. The connection element is made of a soft material with good connection able to bend for large angle. The buckle element can attach the support unit to the back of the receiving unit. When the receiving unit is engaged to the tablet PC for placing on the desk top, the connection element can be bended so that the buckle element is pressed tightly against the support element. Because the buckle element raises the height, the receiving unit can be placed on the desk top in a tilt angle to allow the convenient viewing for the user sitting at the desk as well as input via the touch screen.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
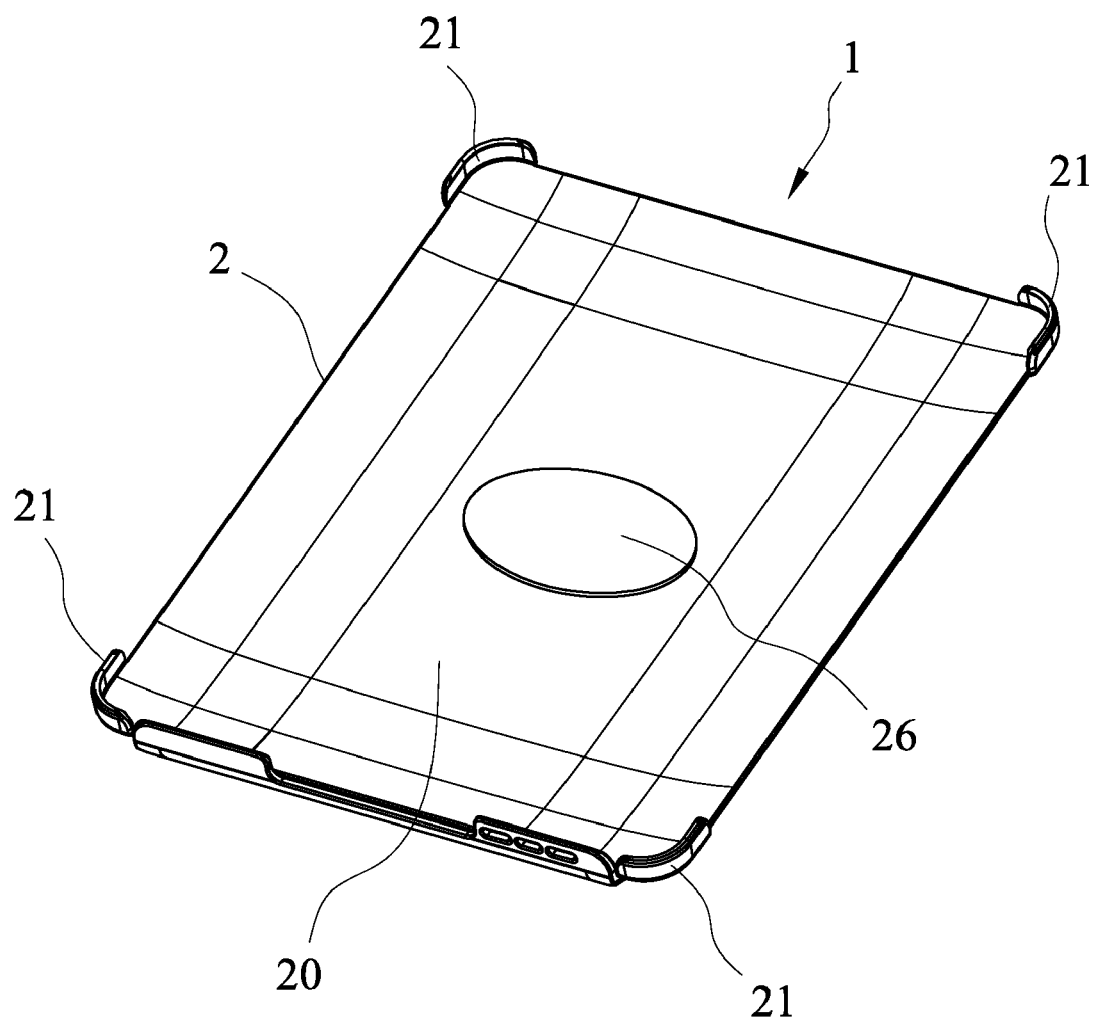
FIG. 1 shows a first schematic view of the present invention.
Figure 2:
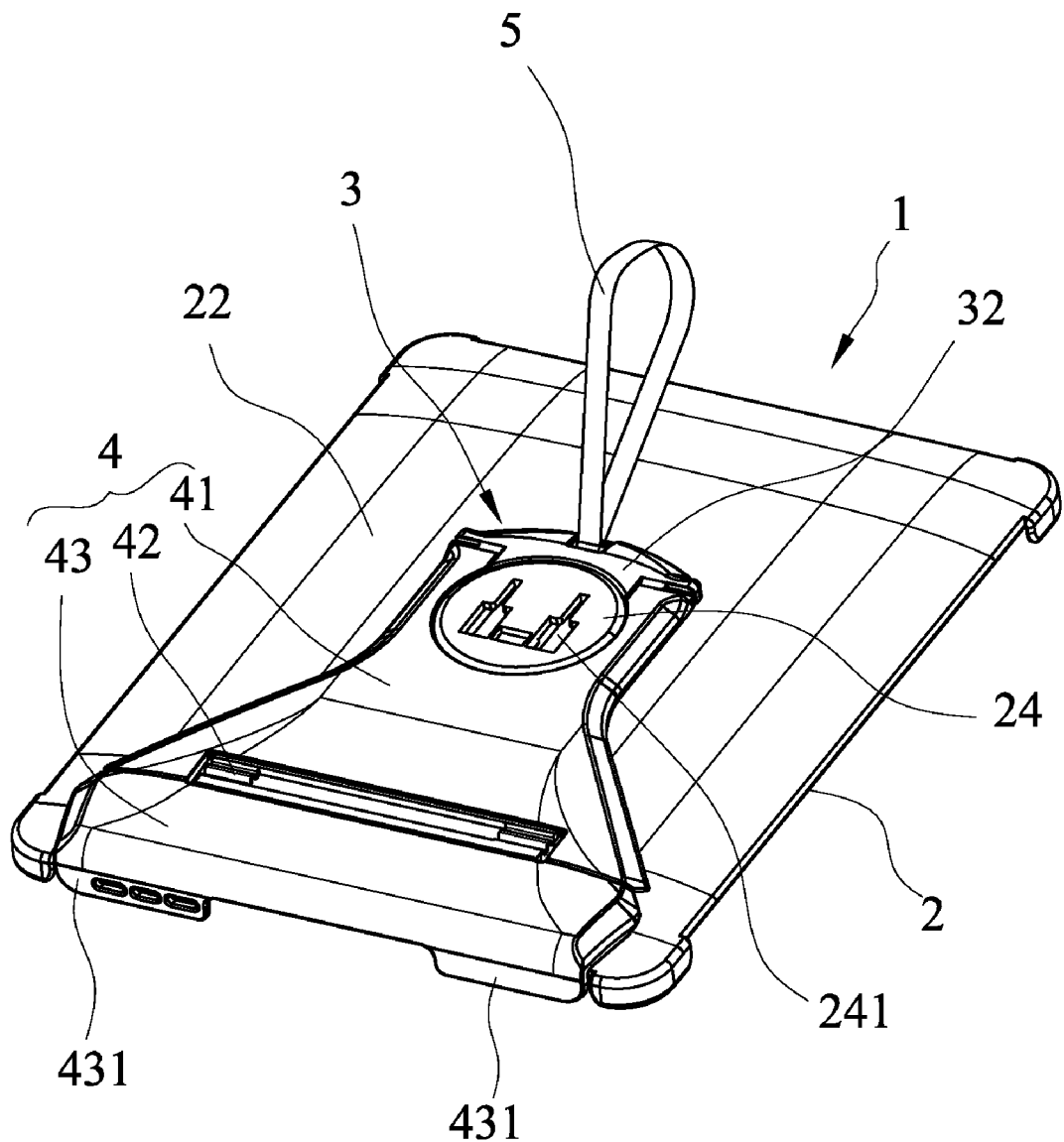
FIG. 2 shows another schematic view of the present invention.

FIG. 1 and FIG. 2 show the front schematic view and the back schematic view of the auxiliary fastening apparatus of the present invention, respectively. Auxiliary fastening apparatus 1 includes a receiving unit 2, an angle adjustment mechanism 3 and a support unit 4. Auxiliary fastening apparatus 1 can further include an auxiliary belt 5.

Receiving unit 2 forms a large-area disk 20. Disk 20 is curvy inwards near the edge so that receiving unit 2 can be slightly resilient for pushing open near the edge area. Disk 20 has a plurality of protruding clappers 21 along the circumference area. Disk 20 is for placing the tablet PC and clappers 21 are for clapping on the circumference of the tablet PC. When table PC is placed on disk 20, receiving unit 2 is slightly pushed open, and the restoration resilient force will make clappers 21 clap on the side of the tablet PC for fastening. In the present embodiment, clappers 21 are curvy and distributed around the four corners of receiving unit 2. But the present invention is not limited to the above embodiment. The number of clappers can be as few as three and distributed on three sides of receiving unit 2 for clapping and fastening.

The opposite surface of disk 20 is back 22 of receiving unit 2. Angle adjustment mechanism 3 is formed at the central region of back 22 and provides coupling to support unit 4. Angle adjustment mechanism 3 can at least allow support unit 4 to adjust for specific angles, such as, 0° and 90°. In the present embodiment, receiving unit 2 has a rectangular shape, and is mainly for portrait mode (vertical) or landscape mode (horizontal). When support unit 4 is adjusted to 0°, the mode is corresponding to the portrait mode (as shown in FIG. 2) of receiving unit 2, and when support unit 4 is adjusted to 90°, the mode is corresponding to the landscape mode of receiving unit 2.

Figure 3:
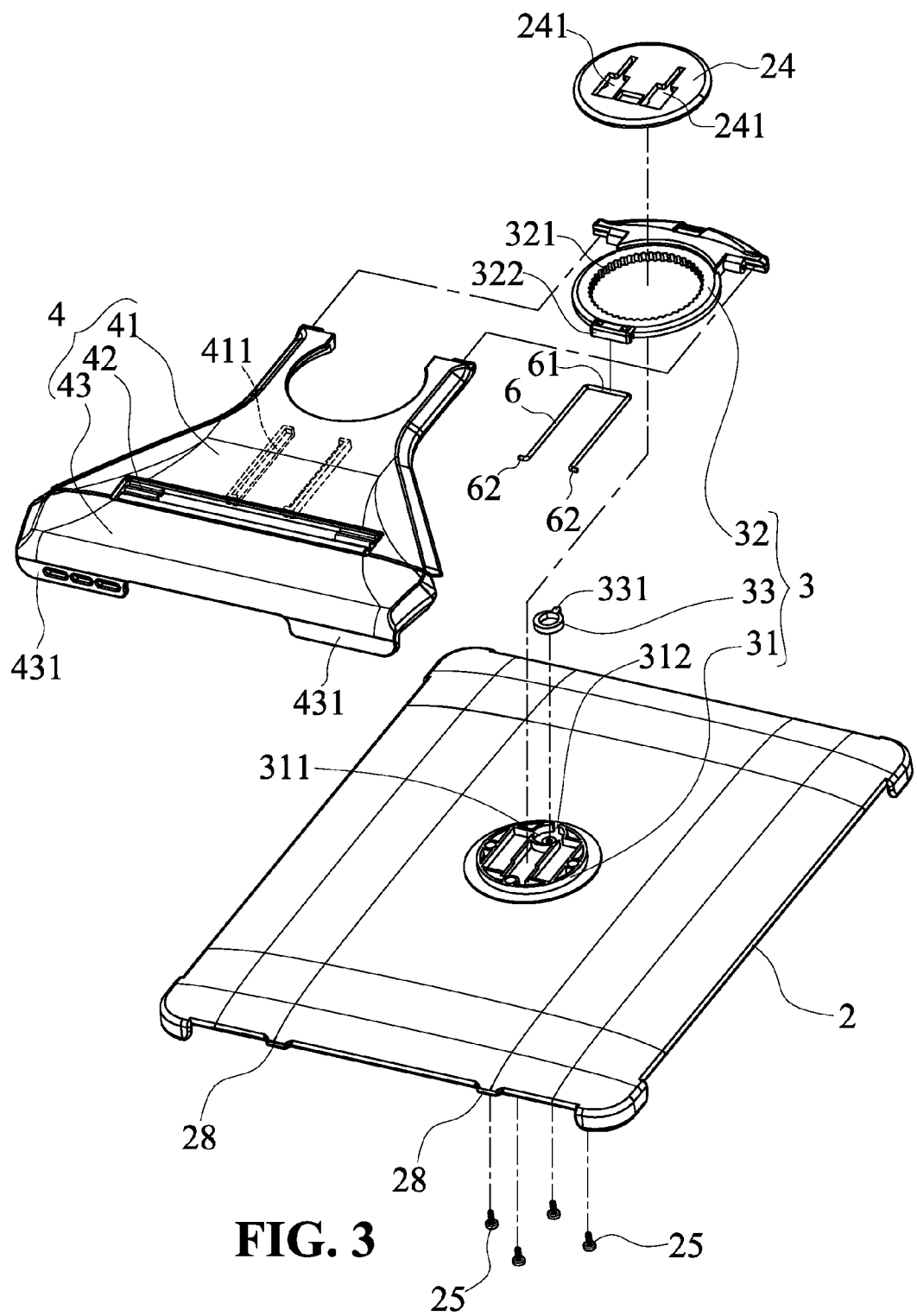
FIG. 3 shows a dissected view of the present invention.
Figure 4:
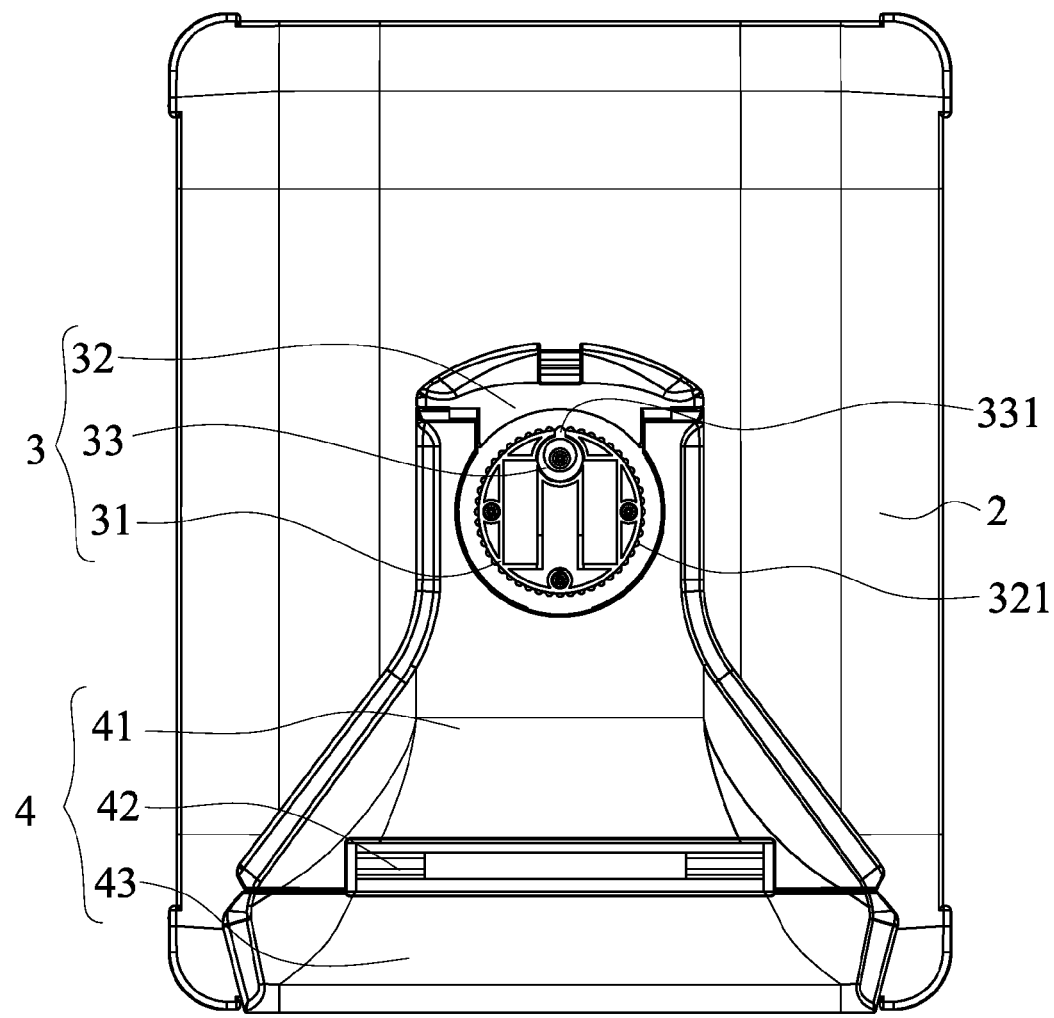
FIG. 4 shows an enlarged view of the present invention after the lid is temporarily removed.

Angle adjustment mechanism 3 can be realized in various embodiments. The present invention uses an exemplary embodiment for explanation, but the present invention is not limited to the scope of the exemplary embodiment. As shown in FIG. 3 and FIG. 4, angle adjustment mechanism 3 includes an axial element 31, a rotation element 32 and a resilient push obstruct element 33. Axial element 31 protrudes from the central region of back 22 of receiving unit 2. The inside of axial element 31 forms a housing space 311 near the circumference. Housing space 311 is to accommodate resilient push obstruct element 33. Axial element 31 has small opening 312 in circumference, and opening 312 is connected to housing space 311. Resilient push obstruct element 33 has a protruding tooth 331 extending via opening 312 to the outside of axial element 31. Resilient push Obstruct element 33 has a ring shape and can be compressed along the diameter direction so that protruding tooth 331 can be displaced for a short distance. Rotation element 32 forms a ring and the inner wall of the ring forms an inner ring tooth 321. Inner ring tooth 321 is sheathed outside of axial element 31. Protruding tooth 311 matches inner ring tooth 321. Rotation element 32 provides coupling to support unit 4. In the present embodiment, rotation element 32 can rotate inside axial element 31 for 360°, and uses protruding tooth 331 to engage inner ring tooth 321 to fasten the position of rotation element 3 after the rotation, In other words, angle adjust mechanism 3 provides a 360° angle adjustment so that support unit 4 can perform different angle adjustment behind the back of receiving unit 2.

As shown in FIG. 3, in the present embodiment, receiving unit 2 further includes a lid 24 and a plurality of screws 25 to hide and fix the positions of each component of angle adjustment mechanism 3. When assembled, lid 24 covers the top surface of axial element 31, and screws 25 engage with and fasten lid 24 from the direction of disk 20 via receiving unit 2. The locations of the screw holes are not visible in FIG. 1 because the central region of disk 20 is glued with a soft pad 26 to enhance esthetics as well as to prevent from scratching the surface of tablet PC. Lid 24 further forms at least a penetrate-through engaging trench 241. Engaging trench 241 provides engagement to other connection device so that receiving unit 2 can be connected in various manners, such as, hanging on a wall or fastened to the inside of a car. The shape of engaging trench 241 in the above embodiment is only exemplary, not restrictive to the scope of the present invention.

As shown in FIG. 2, auxiliary belt 5 is for wrapping around the user's wrist to prevent receiving unit 2 from accidentally slipping from the holding hand and falling on the ground when operating the tablet PC. Auxiliary belt 5 can be attached to at least a component of either receiving unit 2 or angle adjustment mechanism 3. In the present embodiment, auxiliary belt 5 is attached to rotation element 32 of angle adjustment mechanism 3. Auxiliary belt 5 is preferably a ring-shaped belt, easy for wrapping around the wrist. Additional fastening element or elastic band can be added to enhance the effect. Auxiliary belt 5 can also be used to hang on a wall, for example, a user can watch a cooking video while learning to cook.

Figure 5:
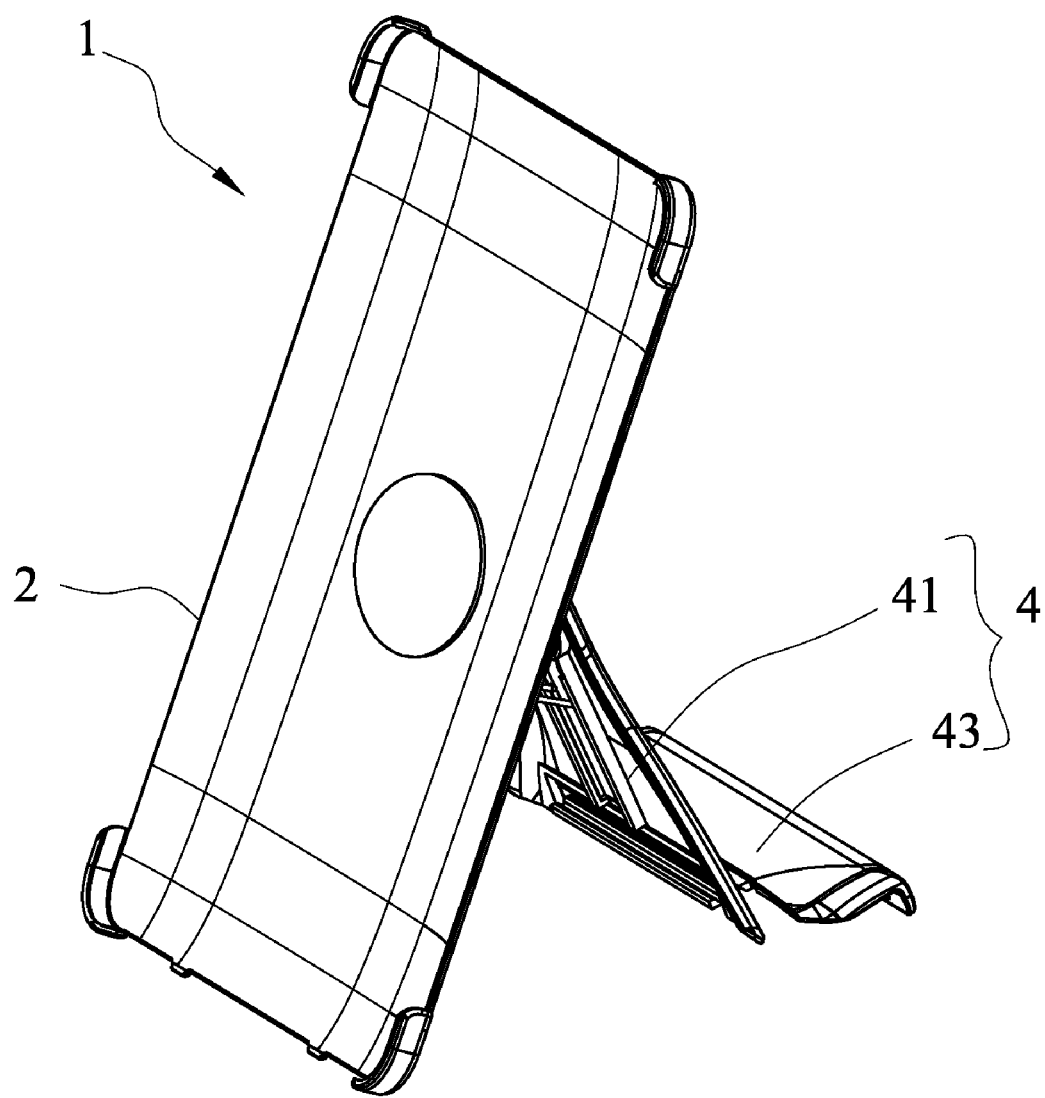
FIG. 5 shows a schematic view of the present invention standing in portrait mode.
Figure 6:
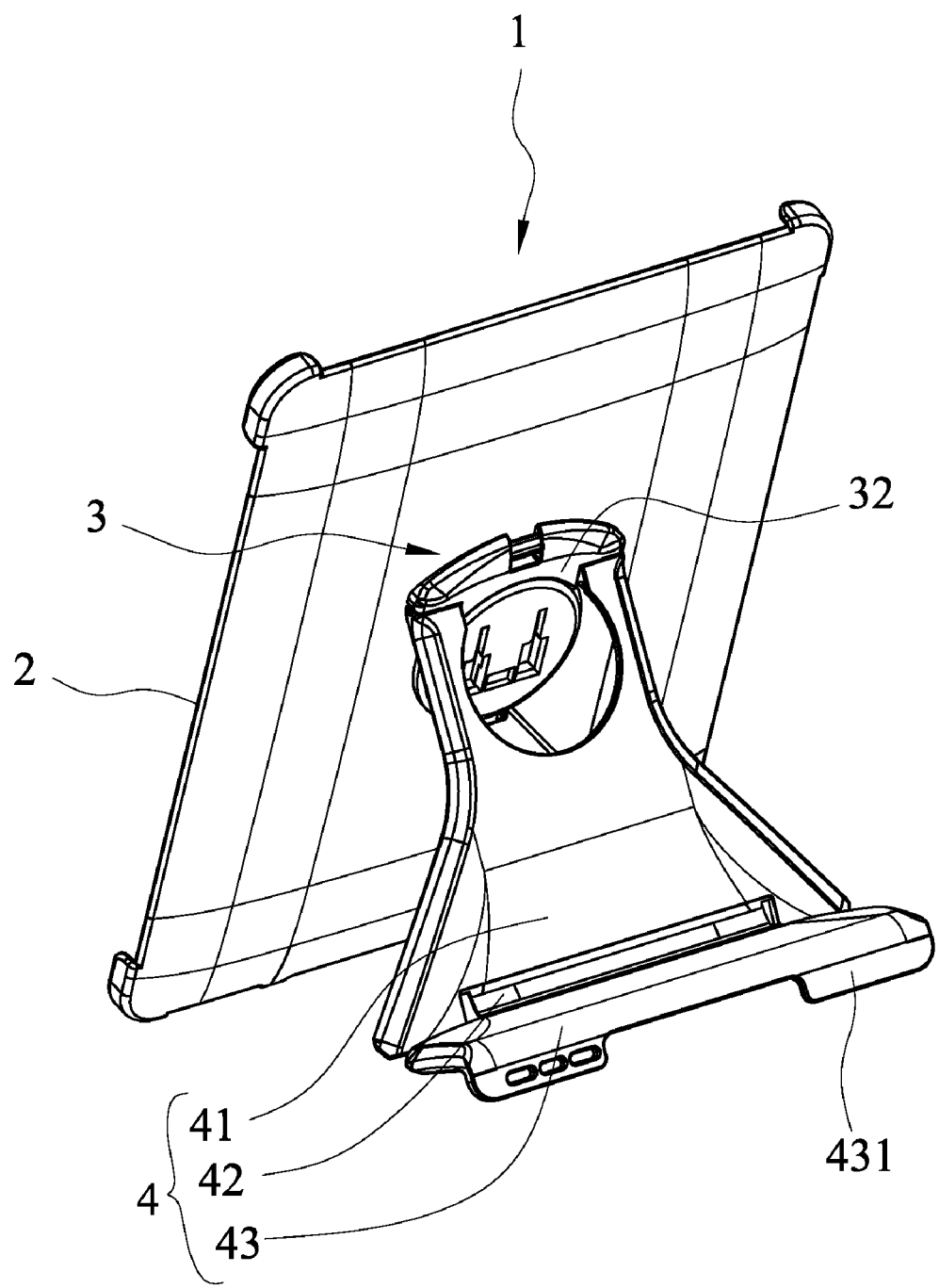
FIG. 6 shows a schematic view of the present invention standing in landscape mode.

Support unit 4 is coupled to angle adjustment mechanism 3. After flipped up, support unit 4 forms an angle with receiving unit 2 to allow receiving unit 2 stay in a standing position. FIG. 5 and FIG. 6 show a schematic view of receiving unit 2 in a standing position in vertical and horizontal modes, respectively. Support unit 4 can be monolithic or constructed with a plurality of components. The present embodiment uses a plurality of components. As shown in FIG. 3, support unit 4 includes a support element 41, a connection element 42 and a buckle element 43. Support element 41 is connected to buckle element 43 via connection element 42. Connection element 42 is made of soft material, such as, textile band, rubber band, rubber hinge, and so on, so that connection element 42 can be bended for a large angle. One end of support element 41 is coupled to rotation element 32 of angle adjustment mechanism 3 as the support frame of support unit 4. In this manner, as shown in FIG. 5 and FIG. 6, when receiving unit 2 is in standing position, connection element 42 is bended so that buckle element 43 is behind support element 41, where support element 41 withstands most of the weight and some friction exists between buckle element 43 and the desk surface to achieve anti-slip purpose.

Figure 7:
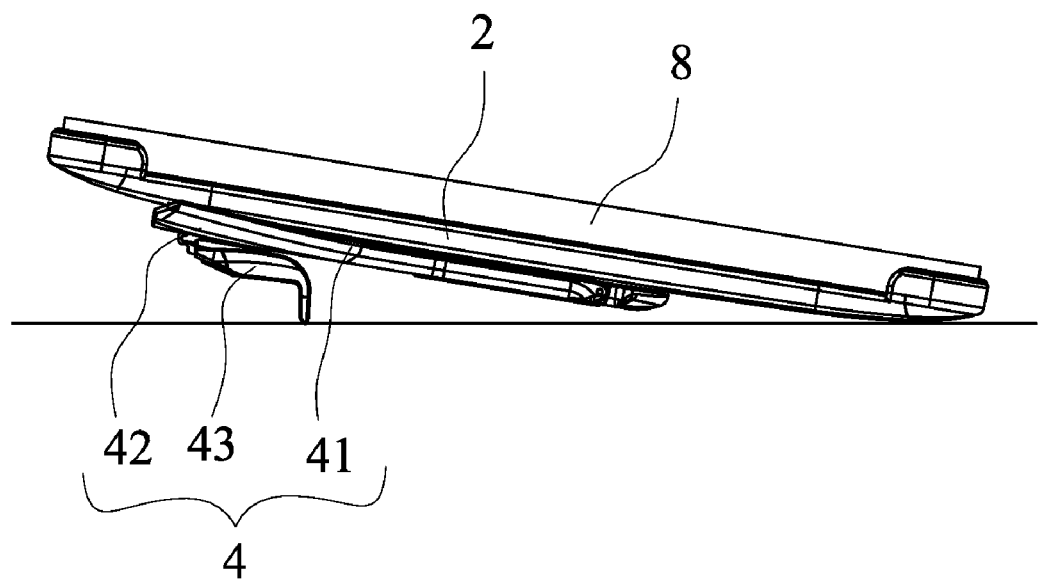
FIG. 7 shows a schematic view of the present invention placed on a desk top.

Buckle element 43 serves two purposes. The first is to make support element 41 tightly press against and fixed to back 22 of receiving unit 2 when support unit 4 is not in use. The second is for buckle element 43 to raise the height of one side of receiving unit 2 so that receiving unit 2 forms a small tilt angle when receiving unit 2 is placed on a desk top surface. Therefore, the side of buckle element 43 away from the connection to connection element 42 forms at least a buckle plate 431. Buckle plate 431 has a bended shape, and is bended towards facing receiving unit 2. The present embodiment includes two buckle plates 431, and the corresponding side on receiving unit 2 forms at least a protruding block 28. Protruding block 28 provides buckle anchor for buckle plate 431. As shown in FIG. 2, support unit 4 uses buckle element 43 for fastening to back 22 of receiving unit 2. As shown in FIG. 7, the bending of connection element 42 allows buckle plate 431 to get closer to or even press tightly against support unit 4. Bended buckle plate 431 raises receiving unit 2 so that when receiving unit 2 is placed on a desk top, receiving unit 2 forms a small angle tilting, and tablet PC 8 engaged to receiving unit 2 also forms a small angle tilting. In this manner, the user can easily operate the tablet PC.

Figure 8:
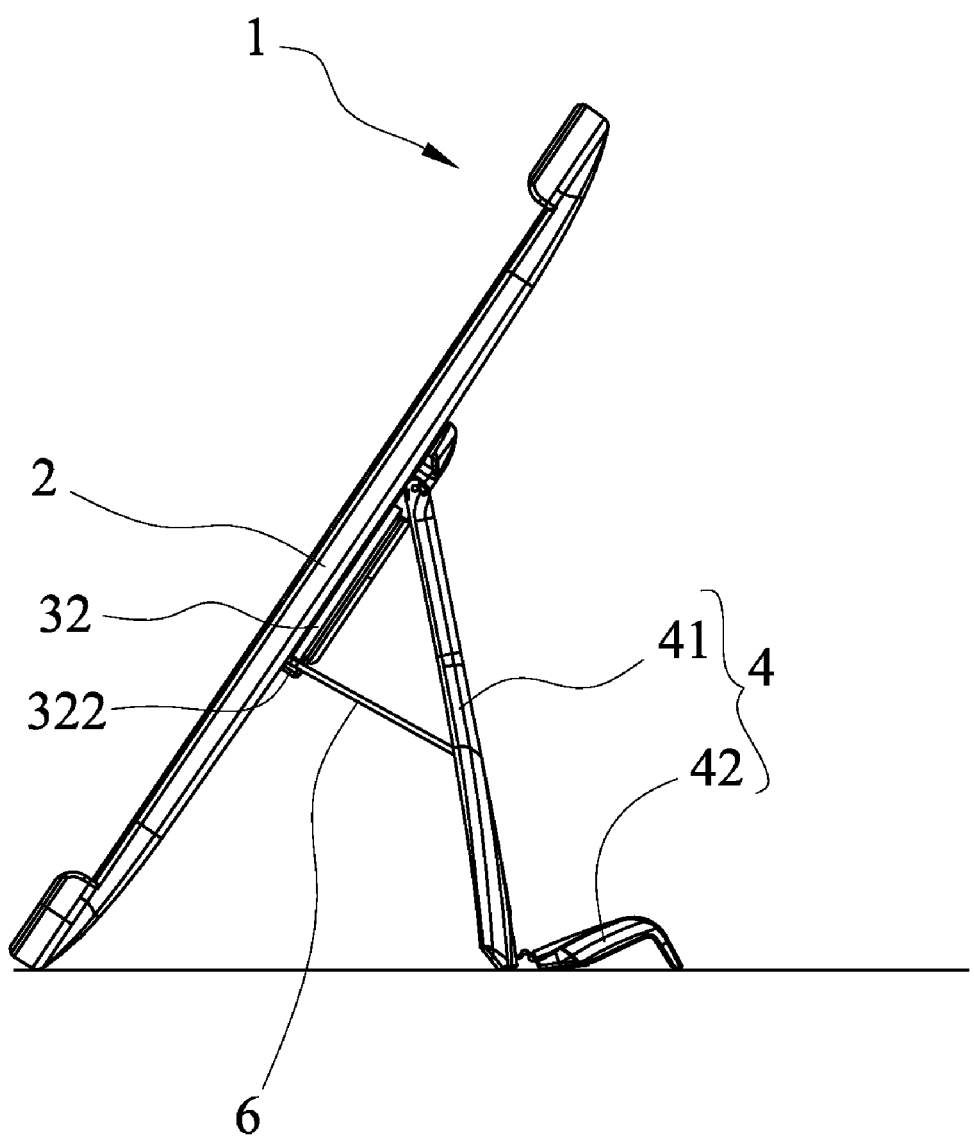
FIG. 8 shows a side view of the present invention standing in portrait mode.

In addition, the present invention also includes a restrictive element 6 between support unit 4 and angle adjustment mechanism 3. Restrictive element 6 is for (1) preventing support unit 4 from over-flipping to form too large an angle with receiving unit 2; (2) avoiding the breaking of the coupling joint between angle adjustment mechanism 3 and support unit 4 when support unit 4 withstands the force and weight; and (3) maintaining and fastening the relative position between support unit 4 and receiving unit 2 after flipping. As shown in FIG. 3, restrictive element 6 is made of metal, and shaped as an Ω. Lateral segment 61 in the middle region is coupled to coupling block 322 of rotation element 32. Coupling block 322 is located away from the coupling location of rotation element 32 and support element 41. The two ends of restrictive element 6 form two protruding segments 62 outwards. The surface of support element 41 facing receiving unit 2 forms corresponding guiding trench 411 in the central region. When assembled, lateral segment 61 of restrictive element 6 is coupled to coupling block 322, and protruding segment 62 slides inside guiding trench 411. As shown in FIG. 8, because of restrictive element 6, the angle between receiving unit 2 and support element 41 is restricted and the relative position between support element 41 and receiving unit 2 is fixed so that receiving unit 2 can be more stable in standing mode.

In summary, the auxiliary fastening apparatus of the present invention is engaged to a tablet PC. When placed on a desk top, the tablet PC tilts a small angle to enable convenient operation of the tablet PC. When held in hand, the auxiliary belt wraps around the wrist to prevent the tablet PC from slipping and falling to the ground. To view video, the support unit is used to stand on the desk top in either portrait or landscape modes. In this manner, the auxiliary fastening apparatus of the present invention provides convenience to the different scenarios of using tablet PC.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An auxiliary fastening apparatus, for engaging to a tablet electronic device, comprising:
    a receiving unit, having a large-area disk, with a plurality of protruding clappers on a circumference of said disk, a rear surface of said disk being a back of said receiving unit;
    an angle adjustment mechanism, formed on the back of said receiving unit, for enabling an angle adjustment; and
    a support unit coupled to said angle adjustment mechanism, said support unit forming an angle with the back of said receiving unit when flipped up, said angle adjustment mechanism enabling said support unit to be angularly adjusted with the back of said receiving unit, said support unit comprising a support element, a connection element and a buckle element, said support element being connected to said buckle element via said connection element, said connection element being made of a soft material to allow said connection element to be bent at a large angle, one end of said support element being coupled to said angle adjustment mechanism to serve as a support frame of said support unit, a side of said buckle element disposed away from a connection to said connection element forming a buckle plate having a shape bent facing towards said receiving unit, said buckle plate being adapted to buckle to a side of said receiving unit, wherein when said connection element is bent, said buckle element is close to said support element.

2. The auxiliary fastening apparatus as claimed in claim 1, wherein said plurality of protruding clappers are formed on at least three sides of said receiving unit.

3. The auxiliary fastening apparatus as claimed in claim 1, wherein said plurality of protruding clappers are bent and formed on four corners of said receiving unit.

4. The auxiliary fastening apparatus as claimed in claim 1, wherein said angle adjustment mechanism further comprising an axial element, a rotation element and a resilient push obstruct element;
    wherein said axial element protrudes from a central region of the back of said receiving unit, an inside of said axial element forming a housing space to accommodate resilient push obstruct element, said resilient push obstruct element having a protruding tooth extending to an outside of said axial element, said rotation element having a ring and an inner wall of said ring forming an inner ring tooth, said inner ring tooth being sheathed outside of said axial element, and said protruding tooth matching to engage said inner ring tooth.

5. The auxiliary fastening apparatus as claimed in claim 1, wherein the central region of the back of said receiving unit forms at least an engaging trench for providing a connection to other connection devices.

6. The auxiliary fastening apparatus as claimed in claim 5, wherein said engaging trench is formed on a lid fastened to said axial element on the back of said receiving unit.

7. An auxiliary fastening apparatus, for engaging to a tablet electronic device, comprising:
    a receiving unit, having a large-area disk, with a plurality of protruding clappers on a circumference of said disk, a rear surface of said disk being a back of said receiving unit;
    an angle adjustment mechanism, formed on the back of said receiving unit, for enabling an angle adjustment;
    a support unit coupled to said angle adjustment mechanism, said support unit forming an angle with the back of said receiving unit when flipped up, said angle adjustment mechanism enabling said support unit to he angularly adjusted with the back of said receiving unit; and
    an auxiliary belt connected to at least one of said angle adjustment mechanism and said receiving unit.

8. The auxiliary fastening apparatus as claimed in claim 7, wherein said auxiliary belt is a ring-shaped belt.

9. The auxiliary fastening apparatus as claimed in claim 1, further comprising a restrictive element connected between said support unit and said angle adjustment mechanism, said restrictive element maintaining an angle and relative position between said support unit and said angle adjustment mechanism after said support unit is flipped up.

10. An auxiliary fastening apparatus, for engaging to a tablet electronic device, comprising:
    a receiving unit, having a large-area disk, with a plurality of protruding clappers on a circumference of said disk, a rear surface of said disk being a back of said receiving unit;
    an angle adjustment mechanism, formed on the back of said receiving unit, for enabling an angle adjustment;
    a support unit coupled to said angle adjustment mechanism, said support unit forming an angle with the back of said receiving unit when flipped up, said angle adjustment mechanism enabling said support unit to be angularly adjusted with the back of said receiving unit, said support unit comprising a support element, a connection element and a buckle element, said support element being connected to said buckle element via said connection element, said connection element being made of a soft material to allow said connection element to be bent at a large angle, one end of said support element being coupled to said angle adjustment mechanism to serve as a support frame of said support unit; and
    an auxiliary belt, connected at least to one of said angle adjustment mechanism and said receiving unit.

* * * * *